United States Patent
Tsubouchi (10) Patent No.: US 9,831,528 B2
(45) Date of Patent: Nov. 28, 2017

(54) NONAQUEOUS ELECTROLYTE SECONDARY BATTERY AND MANUFACTURING METHOD OF THE SAME

(71) Applicant: TOYOTA JIDOSHA KABUSHIKI KAISHA, Toyota-shi, Aichi-ken (JP)

(72) Inventor: Hiroshi Tsubouchi, Okazaki (JP)

(73) Assignee: TOYOTA JIDOSHA KABUSHIKI KAISHA, Aichi-ken (JP)

(*) Notice: Subject to any disclaimer, the term of this patent is extended or adjusted under 35 U.S.C. 154(b) by 0 days.

(21) Appl. No.: 14/729,427

(22) Filed: Jun. 3, 2015

(65) Prior Publication Data

US 2015/0357678 A1    Dec. 10, 2015

(30) Foreign Application Priority Data

Jun. 4, 2014    (JP) ................ 2014-115691

(51) Int. Cl.
| | |
|---|---|
| *H01M 10/0525* | (2010.01) |
| *H01M 10/0567* | (2010.01) |
| *H01M 4/485* | (2010.01) |
| *H01M 10/052* | (2010.01) |
| *H01M 4/02* | (2006.01) |

(52) U.S. Cl.
CPC ...... *H01M 10/0567* (2013.01); *H01M 4/485* (2013.01); *H01M 10/052* (2013.01); *H01M 10/0525* (2013.01); *H01M 2004/021* (2013.01); *H01M 2300/0025* (2013.01); *Y02T 10/7011* (2013.01)

(58) Field of Classification Search
None
See application file for complete search history.

(56) References Cited

U.S. PATENT DOCUMENTS

| | | | |
|---|---|---|---|
| 2003/0124424 A1 | 7/2003 | Takahashi et al. | |
| 2011/0260099 A1* | 10/2011 | Paulsen | C01G 53/006 252/182.1 |

(Continued)

FOREIGN PATENT DOCUMENTS

| | | |
|---|---|---|
| CN | 103229338 A | 7/2013 |
| JP | 2004-014296 A | 1/2004 |

(Continued)

*Primary Examiner* — Sarah A Slifka
*Assistant Examiner* — Haroon S Sheikh
(74) *Attorney, Agent, or Firm* — Sughrue Mion, PLLC (57) ABSTRACT

A manufacturing method according to the present invention includes: preparing a positive-electrode active material including sulfate ions by 0.04 mmol/m² to 0.16 mmol/m² per unit specific surface area; manufacturing a positive electrode by use of the positive-electrode active material including sulfate ions; manufacturing a negative electrode by use of a negative-electrode active material; assembling a battery assembly by accommodating the positive electrode, the negative electrode, and a nonaqueous electrolyte including lithium difluoro bis-oxalate phosphate in a battery outer case, wherein an additive amount (μmol) of the lithium difluoro bis-oxalate phosphate in the nonaqueous electrolyte is determined so as to satisfy Formula (I); and performing a charging process on the battery assembly at least once.

4 Claims, 2 Drawing Sheets

(56) References Cited

U.S. PATENT DOCUMENTS

| | | | | |
|---|---|---|---|---|
| 2012/0064396 | A1* | 3/2012 | Nishie | H01M 10/052 |
| | | | | 429/199 |
| 2012/0313570 | A1* | 12/2012 | Ohtaniuchi | H01M 10/0525 |
| | | | | 320/103 |
| 2013/0244118 | A1 | 9/2013 | Onizuka | |
| 2014/0127582 | A1* | 5/2014 | Nagai | C01G 53/42 |
| | | | | 429/223 |

FOREIGN PATENT DOCUMENTS

| | | |
|---|---|---|
| JP | 2006-318815 A | 11/2006 |
| JP | 2011-124086 A | 6/2011 |
| JP | 2013-131392 A | 7/2013 |
| JP | 2013-175387 A | 9/2013 |
| JP | 2013-211225 A | 10/2013 |
| KR | 10-2013-0086077 A | 7/2013 |

* cited by examiner

FIG.2

NONAQUEOUS ELECTROLYTE SECONDARY BATTERY AND MANUFACTURING METHOD OF THE SAME

INCORPORATION BY REFERENCE

The disclosure of Japanese Patent Application No. 2014-115691 filed on Jun. 4, 2014 including the specification, drawings and abstract is incorporated herein by reference in its entirety.

BACKGROUND OF THE INVENTION

1. Field of the Invention

The present invention relates to a nonaqueous electrolyte secondary battery. More particularly, the present invention relates to a manufacturing method of the battery.

2. Description of Related Art

A nonaqueous electrolyte secondary battery such as a lithium-ion secondary battery has been preferably used as a vehicle drive power supply for an electric vehicle, a hybrid vehicle, and the like, and a so-called portable power supply for a PC, a portable terminal, and the like, because the nonaqueous electrolyte secondary battery is lightweight and has a high energy density as compared with existing batteries.

In such a nonaqueous electrolyte secondary battery, improvement in a cycle characteristic (durability) is considered as a part of improvement in battery performance. As a related conventional technique, the abstract and the like of Japanese Patent Application Publication No. 2011-124086 (JP 2011-124086 A) describes that a cycle characteristic can be improved by using, as a positive-electrode active material, a lithium nickel cobalt manganese composite oxide including 500 ppm to 1000 ppm of sulfate radicals (sulfate ions) on surfaces of primary particles.

In the meantime, some nonaqueous electrolyte secondary batteries are required to have high battery characteristics (e.g., a cycle characteristic and input-output characteristics) under a wide temperature environment (e.g., −30° C. to 60° C.). Its typical example is a battery used as a vehicle-mounted high-output power supply. However, according to studies of inventors of the present invention, the battery as described in JP 2011-124086 A has such a problem that, in a case where a content of sulfate ions is high, for example, when an operating environment or a storage environment is maintained at high temperatures of 40° C. or more for a long term, a constituent element (typically, a transition metal element) is eluted from the positive-electrode active material, which may decrease battery characteristics.

SUMMARY OF THE INVENTION

In view of this, the inventors considered improving battery characteristics (e.g., a high-temperature storage characteristic) under a high-temperature environment by forming a film on a surface of the positive-electrode active material so as to prevent elution of a constituent element thereof. However, the film formed on the surface of the active material can serve as a resistance component at the time when a charge carrier is stored and released, which might cause a decrease in other battery characteristics (e.g., input-output characteristics, particularly an output characteristic under a low-temperature environment) instead. One aspect of the present invention provides a nonaqueous electrolyte secondary battery that can yield an effect caused by addition of sulfate ions and can exhibit excellent battery characteristics under a wide temperature environment (e.g., durability can be compatible with the input-output characteristics at a high level). Further, one aspect of the present invention provides a method for manufacturing such a battery.

The inventors repeated examination from various perspectives to solve the above problem, and found means for solving the problem. Hereby, one aspect of the present invention was accomplished. That is, according to one aspect of the present invention, a manufacturing method of a nonaqueous electrolyte secondary battery, including the following steps (1) to (5), is provided. (1) Preparing a positive-electrode active material including sulfate ions ($SO_4^{2-}$ ions) by not less than 0.04 mmol/m² but not more than 0.16 mmol/m² per unit specific surface area. (2) Manufacturing a positive electrode by use of the positive-electrode active material including sulfate ions. (3) Manufacturing a negative electrode by use of a negative-electrode active material. (4) Assembling a battery assembly by accommodating the positive electrode, the negative electrode, and a nonaqueous electrolyte including lithium difluoro bis-oxalate phosphate ($Li[PF_2(C_2O_4)_2]$; hereinafter also referred to as "LPFO") in a battery outer case. Herein, an additive amount X (µmol) of the lithium difluoro bis-oxalate phosphate in the nonaqueous electrolyte is determined so as to satisfy the following formula (I):

$$0.004 \leq \frac{X}{(Sc \cdot Wc + Sa \cdot Wa)} \leq 0.037 \qquad (I)$$

(in the formula (I), Sc indicates a specific surface area (m²/g) of the positive-electrode active material, Wc indicates a mass (g) of the positive-electrode active material, Sa indicates a specific surface area (m²/g) of the negative-electrode active material, and Wa indicates a mass (g) of the negative-electrode active material). (5) Performing a charging process on the battery assembly at least once, so as to form films on surfaces of the positive-electrode active material and the negative-electrode active material.

By performing the charging process in a state where the positive-electrode active material includes an adequate amount of sulfate ions and the nonaqueous electrolyte includes LPFO within the above range, a film derived from these compounds is formed on the surface of the active material. As a result, a nonaqueous electrolyte secondary battery having excellent battery characteristics can be realized under a wide temperature environment. For example, it is possible to realize a nonaqueous electrolyte secondary battery that can balance input-output characteristics under a low-temperature environment with a storage characteristic under a high-temperature environment at a high level. Further, by determining a content of sulfate ions and an additive amount of LPFO per specific surface area of the active materials, it is possible to appropriately deal with changes in design parameters (e.g., changes in a coating weight and a thickness of the active material layer), thereby making it possible to appropriately secure a balance between the content of sulfate ions and the additive amount of LPFO (eventually, a formation amount of a film on the surface of the active material).

Note that in the present specification the "specific surface area" indicates a value (m²/g) obtained by analyzing, by a BET method (e.g., a BET single point method), a gas adsorbed amount measured by a gas adsorption method (constant capacity adsorption) using nitrogen ($N_2$) gas as an adsorbate.

In one aspect of the manufacturing method described herein, in the assembling of the battery assembly, lithium difluorophosphate ($LiPO_2F_2$) is added to the nonaqueous electrolyte, in addition to the lithium difluoro bis-oxalate phosphate (LPFO). Here, an additive amount Y (μmol) of the lithium difluorophosphate in the nonaqueous electrolyte is determined so as to satisfy the following formula (II):

$$0.018 \leq \frac{Y}{(Sc \cdot Wc + Sa \cdot Wa)} \leq 0.092 \quad (II)$$

(in the formula (II), Sc, Wc, Sa, and Wa are the same as those in the formula (I)). When the battery assembly includes both LPFO and $LiPO_2F_2$, it is possible to form a film derived from the above two types of compounds on the surface of the active material in the initial charge. According to the studies of the inventors, when the film having such a composition is formed on the surface of the active material, it is possible to restrain a temperature increase in the battery at the time when the battery is overcharged. Accordingly, it is possible to achieve a high reliability (overcharge resistance) relative to the overcharge, as well as high battery characteristics in a normal state.

In one aspect of the manufacturing method described herein, a lithium transition metal composite oxide having a layered or spinel structure is used as the positive-electrode active material. The lithium transition metal composite oxide may be provided as the positive-electrode active material from the viewpoint of a high capacity (a high energy density). However, in such an oxide, a transition metal element (particularly, a manganese element) tends to be easily eluted under a high-temperature environment. Accordingly, application of the present invention is particularly preferred. Hereby, it is possible to achieve further excellent battery characteristics (e.g., an energy density, input-output characteristics, and a cycle characteristic can be compatible at a high level).

In another aspect of the technique described herein, a nonaqueous electrolyte secondary battery that can be manufactured according to the above manufacturing method is provided, the nonaqueous electrolyte secondary battery includes a battery assembly by accommodating a positive electrode, a negative electrode, and a nonaqueous electrolyte including lithium difluoro bis-oxalate phosphate in a battery outer case. The battery has such a feature that durability (a cycle characteristic and a high-temperature storage characteristic) and input-output characteristics can be compatible with each other at a higher level than batteries in the related art. Accordingly, by making use of the feature, it is possible to use the battery as a vehicle drive power supply. In other words, a vehicle provided with the nonaqueous electrolyte secondary battery according to the another aspect described herein can be provided.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

The following describes an embodiment of the present invention. Note that a matter that is not particularly mentioned in the present specification but is necessary for execution of the present invention can be understood as a design matter of a person skilled in the art based on related techniques in the art. The present invention can be performed based on what is described in the present specification and a common technical knowledge in the art.

<<Manufacturing Method of Nonaqueous Electrolyte Secondary Battery>>

Figure 1:
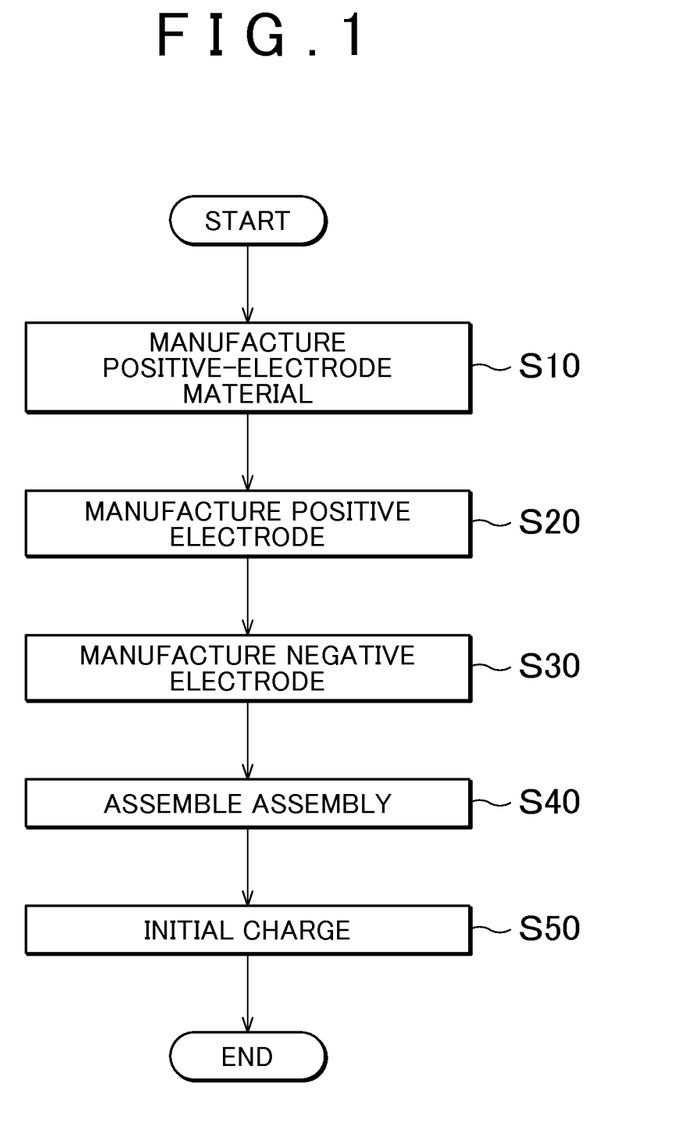
FIG. 1 is a flowchart of a manufacturing method according to one embodiment.

FIG. 1 illustrates a flowchart of a manufacturing method according to one embodiment. The manufacturing method of a nonaqueous electrolyte secondary battery, as disclosed herein, roughly includes: (S10) manufacturing a positive-electrode active material; (S20) manufacturing a positive electrode; (S30) manufacturing a negative electrode; (S40) assembling an assembly; and (S50) initial charge. Note that the steps (S10) to (S40) can be also taken as a manufacturing method of a battery assembly. Each of the steps is explained below sequentially.

<S10. Manufacturing of Positive-Electrode Active Material>

Here, a positive-electrode active material including sulfate ions by not less than 0.04 mmol/m² but not more than 0.16 mmol/m² per unit specific surface area is manufactured. When an amount of sulfate ions is set to 0.04 mmol/m² or more (preferably 0.05 mmol/m² or more, e.g., 0.07 mmol/m² or more), it is possible to improve stability of the positive-electrode active material, and to restrain a high-resistance film from being formed on a surface of the positive-electrode active material. That is, according to the studies of the inventors, in a positive electrode of a general nonaqueous electrolyte secondary battery, a charge carrier can be reacted with carbon dioxide included in the air or a water content in the battery. This forms a high-resistance film including lithium carbonate ($Li_2CO_3$) or lithium hydroxide (LiOH) on a surface of the positive-electrode active material, which may increase a resistance, or elutes a constituent element from the positive-electrode active material, which may decrease a cycle characteristic. When the positive-electrode active material includes sulfate ions by 0.04 mmol/m² or more per unit specific surface area of the positive-electrode active material, it is possible to restrain elution of the constituent element from the positive-electrode active material and an increase in the resistance, thereby making it possible to achieve a high capacity retention (e.g., an excellent high-temperature storage characteristic). Note that sulfate ions included in the surface of the positive-electrode active material can be in a form of a compound (e.g., lithium sulfate ($Li_2SO_4$)) with a charge carrier (typically, lithium), for example. Further, by restraining the amount of sulfate ions to a minimum, i.e., 0.16 mmol/m² or less (preferably, 0.12 mmol/m² or less, e.g., 0.10 mmol/m² or less), it is possible to restrain a resistance of the positive electrode to be further lower. Hereby, it is possible to achieve a high output density even under a low temperature environment of around −30° C., for example.

As the positive-electrode active material, various well-known materials that can be used as a positive-electrode active material for a nonaqueous electrolyte secondary battery can be considered. Examples thereof include layered or spinel lithium transition metal composite oxide materials (e.g., $LiNiO_2$, $LiCoO_2$, $LiMn_2O_4$, $LiFeO_2$, $LiNi_{0.33}Co_{0.33}Mn_{0.33}O_2$, $LiNi_{0.5}Mn_{1.5}O_4$, $LiCrMnO_4$) and olivine materials (e.g., $LiFePO_4$). Especially, from the viewpoint of an energy density and the like, a lithium nickel cobalt manganese composite oxide having a layered structure and containing Li, Ni, Co and Mn as constituent elements can be used. Generally, when a positive-electrode active material including a transition metal element (particularly, a manganese element) is used or stored under a high-temperature environment for a long term, the transition metal element may be eluted and a crystal structure may be broken. Accordingly, application of the present invention is particularly preferred. According to the manufacturing method described herein, even in a case where a large amount of the manganese element that is easy to be eluted under a high-temperature environment is included (more specifically, in a case where a ratio of manganese is 30 mol % to 40 mol % when a total amount of nickel, cobalt, and manganese in the lithium nickel cobalt manganese composite oxide is 100 mol %, for example, high battery performance can be exhibited stably for a long term.

A property of the positive-electrode active material is not limited particularly, but an average particle diameter thereof based on a laser diffraction-light scattering method is preferably 20 μm or less (typically, 1 μm to 20 μm e.g., 5 μm to 15 μm), for example. Further, a specific surface area thereof is preferably not less than 0.1 $m^2/g$ (e.g., not less than 0.5 $m^2/g$) but not more than 5 $m^2/g$ (e.g., not more than 2 $m^2/g$), in general. When one or more of the properties are satisfied, it is possible to achieve higher battery characteristics (e.g., a high energy density and high input-output characteristics). Note that, in the present specification, the "average particle diameter" refers to a 50% cumulative particle diameter (also referred to as a $D_{50}$ particle diameter, a median diameter) from a fine particle side in a volume-based particle size distribution measured by a particle size distribution measurement based on a general laser diffraction-light scattering method.

A method to obtain the positive-electrode active material including sulfate ions is not limited in particular. Examples of the method include: a method in which sulfate is used as a raw material compound at a stage of synthesizing a positive-electrode active material so as to leave sulfate ions (which can be in a form of sulfate) in the positive-electrode active material; a method in which a sulfate-ion additive agent including sulfate ions is caused to make contact with a positive-electrode active material prepared by purchasing a commercially available product or the like; and so on. Examples of a method to cause the positive-electrode active material to make contact with the sulfate-ion additive agent include: a method in which the positive-electrode active material and the sulfate-ion additive agent are mixed with each other and burned: a method in which the positive-electrode active material is dispersed in a water solution including sulfate ions and is maintained for a predetermined time; a method in which the positive-electrode active material is exposed to a sulfate gas atmosphere for a predetermined time; and so on.

For example, in a case where sulfate is used as a raw material compound at a stage of synthesizing a positive-electrode active material, a desired metal sulfate (e.g., nickel sulfate, cobalt sulfate, manganic sulfate) is first dissolved in an aqueous solvent, so as to prepare a mixed solution. Then, a basic aqueous solution with pH of 11 to 14 is added and stirred in such a mixed solution, so as to cause a liquid-phase reaction (neutralization reaction) in the solution. Hereby, a transition metal hydroxide serving as a precursor is obtained. As the basic aqueous solution, a solution including a strong base (alkali metal hydroxide or the like) and a weak base (ammonium ions or the like), e.g., aqueous sodium hydroxide and ammonium hydroxide can be used. Then, the precursor and a lithium salt (e.g., lithium carbonate) are mixed with each other and burned under a predetermined burning condition (e.g., burning temperature: 900° C. to 1000° C., burning time: 10 hours to 15 hours). Hereby, the positive-electrode active material including sulfate ions can be obtained. In such a method, it is possible to control the amount of sulfate ions that remain in the positive-electrode active material by adjusting the burning condition (the burning temperature and/or the burning time).

<S20. Manufacturing of Positive Electrode>

Herein, a positive electrode is manufactured by use of the positive-electrode active material including sulfate ions. A manufacturing method of the positive electrode is not limited in particular except that the above positive-electrode active material is used, and the same manufacturing method as in the related art may be used. For example, the positive-electrode active material, a binder (a binding agent), and other materials to be added as needed are first dispersed in a suitable solvent (e.g., N-methyl-2-pyrrolidone), so as to prepare a pasty or slurry composition. Then, after the composition thus obtained is applied to a surface of a positive-electrode current collector body, the solvent is removed by drying. After that, pressing and the like is performed thereon as needed. Thus, a positive electrode having a positive-electrode active material layer on the positive-electrode current collector body can be manufactured. As the positive-electrode current collector body, a conductive member made of metal (e.g., aluminum, nickel, or the like) having a good electrical conductivity can be used.

As the binder, a halogenation vinyl resin such as polyvinylidene fluoride (PVdF); a polyalkylene oxide such as polyethylene oxide (PEO); and the like can be used, for example. Further, examples of the materials to be added as needed include a conductive material, a dispersing agent, a thickener, an inorganic compound (an overcharge inhibitor, an overcharge additive, a gas generator) that generates gas when a battery is overcharged. As the conductive material, carbon materials such as carbon black (typically, acetylene black and Ketjen black), active carbon, graphite, and carbon fiber can be used, for example.

An appropriate content ratio of the positive-electrode active material in a whole solid content of the above composition is approximately 60 mass % or more (typically, 60 mass % to 98 mass %), and may be set to approximately 70 mass % to 95 mass % in general. This can realize a high energy density. A content ratio of the binder in the whole solid content of the composition can be approximately 0.5 mass % to 10 mass %, for example, and may be approximately 1 mass % to 5 mass % in general. This makes it possible to secure mechanical strength (shape retentivity) of the positive-electrode active material layer, and to realize good durability. In a case where the conductive material is used, a content ratio of the conductive material in the whole solid content of the composition can be approximately 2 mass % to 20 mass %, for example, and may be approximately 3 mass % to 10 mass % in general. This makes it possible to further increase electron conductivity in the positive-electrode active material layer, thereby making it possible to achieve a cycle characteristic at a higher rate.

From the viewpoint of securing a battery capacity, a mass (basis mass) of the positive-electrode active material layer provided per unit area of the positive-electrode current collector body may be 3 mg/cm$^2$ or more (e.g., 5 mg/cm$^2$ or more, typically 7 mg/cm$^2$ or more) for each surface of the positive-electrode current collector body. Further, from the viewpoint of securing input-output characteristics, the mass (basis mass) of the positive-electrode active material layer provided per unit area of the positive-electrode current collector body may be 100 mg/cm$^2$ or less (e.g., 70 mg/cm$^2$ or less, typically 50 mg/cm$^2$ or less) for each surface of the positive-electrode current collector body. Further, an average thickness of the positive-electrode active material layer provided on each surface may be not less than 20 μm (typically, not less than 40 μm, preferably not less than 50 μm) but not more than 100 μm (typically, not more than 80 μm), for example. Further, a density of the positive-electrode active material layer may be not less than 1 g/cm$^3$ (typically, not less than 1.5 g/cm$^3$) but not more than 4 g/cm$^3$ (e.g., not more than 3.5 g/cm$^3$), for example. This makes it possible to secure moderate gaps in the positive-electrode active material layer, and to sufficiently infiltrate a nonaqueous electrolyte through the positive-electrode active material layer. As a result, a wide reaction field with the charge carrier can be secured, so that high input-output characteristics can be achieved. Further, conductivity in the positive-electrode active material layer can be maintained well, so that an increase in resistance can be restrained. Furthermore, mechanical strength (shape retentivity) of the positive-electrode active material layer can be secured, so that an excellent cycle characteristic (durability) can be achieved.

<S30. Manufacturing of Negative Electrode>

Herein, a negative electrode is manufactured by use of a negative-electrode active material. A manufacturing method of the negative electrode is not limited in particular, and the same manufacturing method as in the related art may be used. For example, the negative-electrode active material, a binder (a binding agent), and other materials to be added as needed are first dispersed in a suitable solvent (e.g., ion-exchange water, N-methyl-2-pyrrolidone), so as to prepare a pasty or slurry composition. Then, after the composition thus obtained is applied to a surface of a negative-electrode current collector body, the solvent is removed by drying. After that, pressing and the like is performed thereon as needed. Thus, a negative electrode having a negative-electrode active material layer on the negative-electrode current collector body can be manufactured. As the negative-electrode current collector body, a conductive member made of metal (e.g., copper, nickel, or the like) having a good electrical conductivity can be preferably used.

As the negative-electrode active material, various well-known materials that can be used as a negative-electrode active material for a nonaqueous electrolyte secondary battery can be considered. Examples thereof include graphite, hardly graphitized carbon (hard carbon), easily graphitized carbon (soft carbon), carbon nano-tube, and various carbon materials (amorphous coated graphite) having structures obtained by combining them. Especially, from the viewpoint of an energy density, graphite materials such as natural graphite, artificial graphite, and amorphous carbon coated natural graphite can be used, and particularly, amorphous carbon coated natural graphite can be used. Generally, in the graphite, a part having a high reaction activity, called an edge surface, develops as crystallinity increases. Because of this, when a film including amorphous carbon is formed on at least part of a surface, it is possible to restrain reductive decomposition of a nonaqueous electrolyte. This makes it possible to achieve a further excellent cycle characteristic.

A property of the negative-electrode active material is not limited particularly, but an average particle diameter thereof based on a laser diffraction-light scattering method may be 50 μm or less (typically, 1 μm to 20 μm, e.g., 5 μm to 15 μm), for example. Further, a specific surface area thereof may be not less than 1 m$^2$/g (e.g., not less than 2 m$^2$/g) but not more than 10 m$^2$/g (e.g., not more than 5 m$^2$/g), in general. When one or more of the properties are satisfied, it is possible to achieve higher battery characteristics (e.g., a high energy density and high input-output characteristics).

Styrene butadiene rubber (SBR), polyvinylidene fluoride (PVdF), polytetrafluoroethylene (PTFE), or the like can be used as the binder, for example. Further, examples of the materials to be added as needed include a conductive material, a dispersing agent, a thickener, and the like. Celluloses such as carboxymethyl cellulose (CMC) or methyl cellulose (MC) can be used as the thickener, for example.

An appropriate content ratio of the negative-electrode active material in a whole solid content of the composition is approximately 50 mass % or more, and may be 90 mass % to 99 mass % (e.g., 95 mass % to 99 mass %) in general. This can realize a high energy density. A content ratio of the binder in the whole solid content of the composition may be approximately 1 mass % to 10 mass %, for example, and may be approximately 1 mass % to 5 mass % in general. This makes it possible to secure mechanical strength (shape retentivity) of the negative-electrode active material layer, and to achieve good durability. In a case where the thickener is used, a content ratio of the thickener in the whole solid content of the composition may be approximately 1 mass % to 10 mass %, for example, and may be approximately 1 mass % to 5 mass % in general.

From the viewpoint of securing a battery capacity, a mass (basis mass) of the negative-electrode active material layer provided per unit area of the negative-electrode current collector body may be 5 mg/cm$^2$ or more (typically, 7 mg/cm$^2$ or more) for each surface of the negative-electrode current collector body. Further, from the viewpoint of securing input-output characteristics, the mass (basis mass) of the negative-electrode active material layer provided per unit area of the negative-electrode current collector body may be 100 mg/cm$^2$ or less (typically, 80 mg/cm$^2$ or less) for each surface of the negative-electrode current collector body. Further, an average thickness of the negative-electrode active material layer provided on each surface (typically, an average thickness of the negative-electrode active material layer on each surface after the pressing) may be not less than 40 μm (typically, not less than 50 μm) but not more than 100 μm (typically, not more than 80 μm), for example. Further, a density of the negative-electrode active material layer may be not less than 0.5 g/cm$^3$ (typically, not less than 1 g/cm$^3$) but not more than 2 g/cm$^3$ (typically, not more than 1.5 g/cm$^3$), for example.

<S40. Assembling of Assembly>

Here, the above positive electrode, the above negative electrode, and a nonaqueous electrolyte are accommodated in a battery outer case to assemble a battery assembly. As the battery outer case, a battery outer case made of a lightweight metal material such as aluminum can be employed, for example. The nonaqueous electrolyte exhibits a liquid state at a normal temperature (e.g., 25° C.). In one aspect, the nonaqueous electrolyte always exhibits a liquid state under an operating environment of the battery (for example, under a temperature environment of −30° C. to 60° C.). In the manufacturing method described herein, a predetermined amount of lithium difluoro bis-oxalate phosphate (LPFO) is included, as a film-forming agent, in the nonaqueous electrolyte in addition to a nonaqueous solvent and a supporting salt.

As the nonaqueous solvent, various organic solvents used for a general nonaqueous electrolyte, such as organic solvents of carbonates, ethers, esters, nitriles, sulfones, lactones, and the like, can be considered. Specific examples thereof include ethylene carbonate (EC), propylene carbonate (PC), diethyl carbonate (DEC), dimethyl carbonate (DMC), ethylmethyl carbonate (EMC), and the like. One of the nonaqueous solvents can be used solely, or two or more thereof can be used in combination as appropriate.

As the supporting salt, a supporting salt used for a general nonaqueous electrolyte secondary battery can be used selectively as appropriate, provided that the supporting salt includes a charge carrier (e.g., lithium ion, sodium ion, magnesium ion, and the like; the lithium ion is used in the case of a lithium-ion secondary battery). Concrete examples thereof include lithium salts such as $LiPF_6$, $LiBF_4$, $LiClO_4$, $LiAsF_6$, $Li(CF_3SO_2)_2N$, and $LiCF_3SO_3$. One of the supporting salts can be used solely, or two or more thereof can be used in combination. A particularly preferable supporting electrolyte is $LiPF_6$. Further, a concentration of the supporting salt may be adjusted to 0.7 mol/L to 1.3 mol/L relative to a whole nonaqueous electrolyte.

Lithium difluoro bis-oxalate phosphate ($Li[PF_2(C_2O_4)_2]$: LPFO) is an oxalate complex compound having a structural part in which two oxalate ions ($C_2O_4^{2-}$) are coordinated to phosphor (P). When such a compound is included in the nonaqueous electrolyte, the compound is electrically decomposed in the after-mentioned initial charge (S50). Then, a high-quality film (having a low reactivity with the nonaqueous electrolyte and having a low resistance, for example) is formed on surfaces of the positive-electrode and negative-electrode active materials. In the manufacturing method disclosed herein, an additive amount (μmol) of LPFO to the nonaqueous electrolyte is determined according to a total specific surface area ($m^2$) of the positive-electrode and negative-electrode active materials included in the battery. More specifically, the nonaqueous electrolyte is configured to include LPFO by not less than 0.004 μmol/$m^2$ (preferably not less than 0.015 μmol/$m^2$, e.g., not less than 0.029 μmol/$m^2$) but not more than 0.037 μmol/$m^2$ per unit specific surface area of the positive-electrode and negative-electrode active materials. Note that the "total specific surface area of the positive-electrode and negative-electrode active materials" can be obtained by a total sum (ScWc+SaWa) of a product of a BET specific surface area Sc ($m^2/g$) and a mass Wc (g) of the positive-electrode active material and a product of a specific surface area Sa ($m^2/g$) and a mass Wa (g) of the negative-electrode active material. When the additive amount of LPFO is in the above range, it is possible to prevent a decrease in durability due to shortage of an amount of a film formed on the surfaces of the positive-electrode and negative-electrode active materials, or to prevent an increase in resistance due to an excessive amount of the film formed on the surfaces of the positive-electrode and negative-electrode active materials. Further, by determining the additive amount of LPFO according to the specific surface area of the active materials, it is possible to stably (accurately) form an optimum amount of the film on the surfaces of the active materials.

In one aspect, lithium difluorophosphate ($LiPO_2F_2$) is further included in the nonaqueous electrolyte. When such a compound is included in the nonaqueous electrolyte, it is possible to form a film having a high thermostability on the surfaces of the active materials in the after-mentioned initial charge (S50). An additive amount of $LiPO_2F_2$ to the nonaqueous electrolyte may be determined according to the total specific surface area (ScWc+SaWa) of the active materials included in the battery, similarly to the above LPFO. More specifically, $LiPO_2F_2$ may be included in the nonaqueous electrolyte by not less than 0.018 μmol/$m^2$ (e.g., not less than 0.037 μmol/$m^2$) but not more than 0.092 μmol/$m^2$ (e.g., not more than 0.055 μmol/$m^2$) with respect to the total specific surface area of the positive-electrode and negative-electrode active materials. When $LiPO_2F_2$ is included by 0.018 μmol/$m^2$ or more, it is possible to highly restrain a reaction between the nonaqueous electrolyte and the active materials (typically, the positive-electrode active material) even at the time of overcharge of the battery. This makes it possible to appropriately restrain a temperature increase inside the battery, thereby making it possible to realize a battery having a high overcharge resistance. Further, when $LiPO_2F_2$ is included by 0.092 μmol/$m^2$ or less, it is possible to prevent an increase in resistance due to the film being excessively formed on the surfaces of the active materials (typically, the positive-electrode active material). This accordingly makes it possible to achieve excellent input-output characteristics even under a low-temperature environment, for example.

Further, various additives can be further included in the nonaqueous electrolyte as needed, as long as the effects of the present invention are not impaired remarkably. Examples of the additives include film-formers such as lithium bis(oxalato)borate (LiBOB), vinylene carbonate (VC), vinylethylene carbonate (VEC), and fluoroethylene carbonate (FEC); compounds, such as biphenyl (BP) and cyclohexylbenzene (CHB), which can generate gas at the time of overcharge; a surface active agent; a dispersing agent; a thickener; and the like.

<S50. Initial Charge (Conditioning)>

Here, a charging process is performed on the battery assembly at least once. Typically, an external power supply is connected between the positive electrode (a positive terminal) and the negative electrode (a negative terminal) of the assembly, and the assembly is charged to a predetermined voltage range (typically, by constant-current charge). Hereby, a film-forming agent (at least LPFO) is electrically decomposed, so that films derived from the film-forming agent are formed on surfaces of the positive-electrode active material and the negative-electrode active material. In one typical aspect, first, part of LPFO is decomposed by reduction in the negative electrode, so that a film (e.g., a film including oxalate ions ($C_2O_4^{2-}$)) including its decomposition product is formed on the surface of the negative-electrode active material. Further, the decomposition product partially moves to the positive electrode, so that a film is formed on the surface of the positive-electrode active material. Note that the film can also include sulfate ions included in the surface of the positive-electrode active material. In other words, by performing the initial charge, the film (including oxalate ions, for example) derived from LPFO is formed on the surface of the negative-electrode active material, and the film (including oxalate ions and sulfur atoms, for example) derived from LPFO and sulfate ions is formed on the surface of the positive-electrode active material. Further, from the viewpoint of an overcharge resistance, the films formed on the surfaces of the positive-electrode and negative-electrode active materials may further include a component derived from $LiPO_2F_2$.

The charging process may be performed until a potential (vs. $Li/Li^+$) of the negative electrode becomes generally equal to a reduction potential (vs. Li/Li$^+$) of LPFO or lower than the reduction potential by 0.05 V (vs. Li/Li$^+$) or more (preferably 0.1 V (vs. Li/Li$^+$) or more). For example, the charging may be performed until a voltage (typically, a maximum achievable voltage) between the positive and negative terminals reaches approximately 3.95 V to 4.05 V, for example. This makes it possible to accurately form the films on the surfaces of the positive-electrode and negative-electrode active materials. A charging method is not limited in particular. For example, the charging may be performed by a charging method (CC charge) in which the charging is performed at a constant current until the potential of the negative electrode reaches the above potential, or may be performed by a charging method (CCCV charge) in which the charging is performed at a constant current until the potential of the negative electrode reaches the above potential, and then the charging is performed at a constant voltage. In one aspect, the charging process is performed by the CCCV charge. This makes it possible to sufficiently move, to a positive-electrode side, part of that decomposition product of LPFO which is caused in the negative electrode, and to accurately form the film on the surface of the positive-electrode active material. A charging rate in the CC charge is not limited in particular, but if the charging rate is too low, efficiency of the process tends to decrease. Meanwhile, if the charging rate is too high, the active materials may deteriorate or quality of a film to be formed may decrease. In view of this, the charging rate may be set to about 1/10 C to 10 C, for example. This makes it possible to form a very fine film (that has a low resistance and can sufficiently restrain a reaction with the nonaqueous electrolyte) in a short time. Note that the charging process may be performed once, or may be repeated twice or more times with a discharging process being performed every time after the charging process, for example. In such a manufacturing method, the nonaqueous electrolyte secondary battery disclosed herein can be assembled.

Note that, in the manufacturing method disclosed herein, most of LPFO added herein is decomposed by reduction in the negative electrode due to charging (typically, the initial charge), and is used to form films on the surfaces of the active materials. Accordingly, in the present invention, it is not necessary for LPFO itself to remain in the nonaqueous electrolyte in the battery (e.g., the battery after the initial charge) after a lapse of time from assembly of the battery.

Although it is not intended to limit the present invention particularly, as one embodiment of the present invention, the following description deals with an example of a nonaqueous electrolyte secondary battery configured such that a flat wound electrode body and a nonaqueous electrolyte are accommodated in a battery outer case having a flat rectangular solid shape. Note that, in the following drawings, a description is made by assigning the same reference sign to members/parts that yield the same effect, and a redundant description may be omitted or simplified. Note that a dimensional relationship (length, width, thickness, and the like) in each drawing does not necessarily show an actual dimensional relationship.

Figure 2:
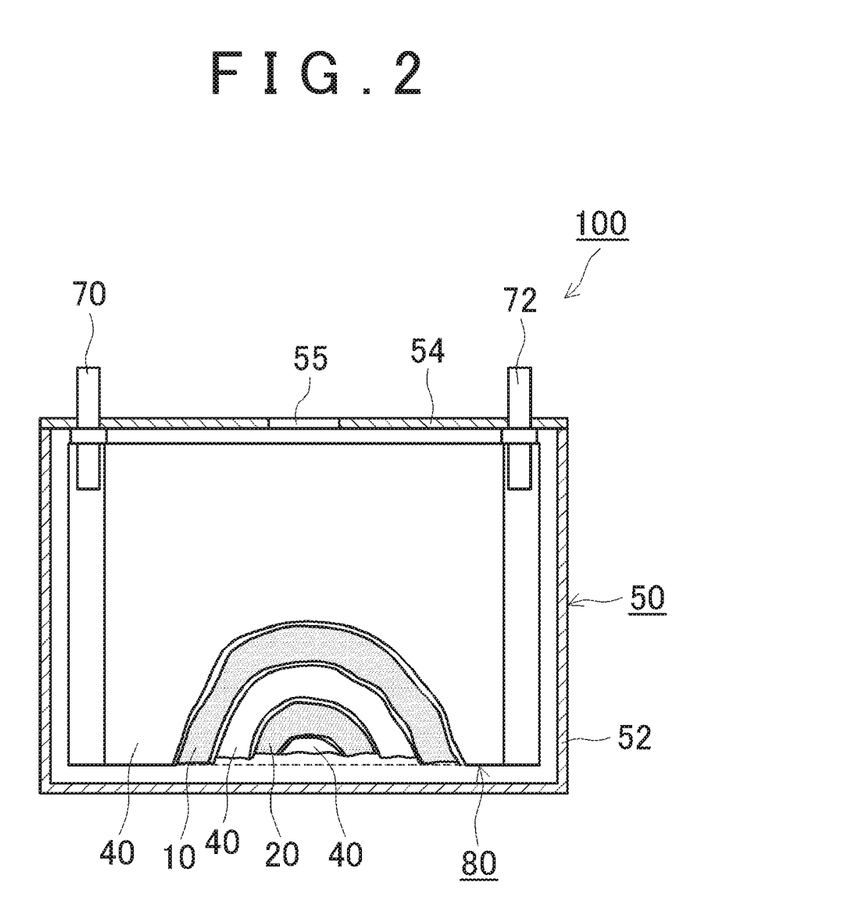
FIG. 2 is a view schematically illustrating a sectional structure of a nonaqueous electrolyte secondary battery according to one embodiment.

FIG. 2 is a drawing of a longitudinal section schematically illustrating a sectional structure of a nonaqueous electrolyte secondary battery 100. The nonaqueous electrolyte secondary battery 100 is configured such that an electrode body (a wound electrode body) 80 and a nonaqueous electrolyte (not shown) are accommodated in a battery outer case 50 having a flat box shape. The electrode body 80 is configured such that a positive electrode sheet 10 and a negative electrode sheet 20 are wound via separators 40 in a flat shape.

The battery outer case 50 includes a flat rectangular solid-shaped (box-shaped) case main body 52 of which an upper end is opened, and a cover 54 covering its opening. As a material of the battery outer case 50, relatively lightweight metal (e.g., aluminum or aluminum alloy) can be employed. An external-connection positive terminal 70 electrically connected to a positive electrode of the wound electrode body 80, and a negative terminal 72 electrically connected to a negative electrode of the electrode body 80 are provided on a top face (that is, the cover 54) of the battery outer case 50. Further, the cover 54 is provided with a relief valve 55 configured to exhaust gas generated inside the battery outer case 50 to outside the case 50.

The flat wound electrode body 80 and the nonaqueous electrolyte (not show) are accommodated in the battery outer case 50. The wound electrode body 80 includes an elongated sheet-shaped positive electrode (the positive electrode sheet) 10, and an elongated sheet-shaped negative electrode (the negative electrode sheet) 20. The positive electrode sheet 10 includes an elongated positive-electrode current collector body, and a positive-electrode active material layer formed on at least one surface (typically, both surfaces) thereof along a longitudinal direction. The negative electrode sheet 20 includes an elongated negative-electrode current collector body, and a negative-electrode active material layer formed on at least one surface (typically, both surfaces) thereof along a longitudinal direction. Further, two elongated sheet-shape separators (separator sheets) 40 as insulation layers for preventing direct contact between the positive-electrode active material layer and the negative-electrode active material layer 24 are placed therebetween.

As the separator sheet 40, porous sheets made of resins such as polyethylene (PE), polypropylene (PP), polyester, cellulose, and polyamide, nonwoven fabrics, and the like can be used. Note that the separator sheet 40 may have a single-layered structure, or a structure in which two or more types of porous sheets made of different materials or having different properties (thickness, porosity, or the like) are laminated. Further, for the purpose of prevention of internal short-circuit or the like, a porous heat resistance layer including inorganic compound particulates (inorganic fillers) may be provided on one surface or both surfaces of the porous resin sheet.

A winding core portion is formed in a central portion of the wound electrode body 80 in a width direction defined as a direction directed from one end part of the wound electrode body 80 in a winding-shaft direction toward the other end part thereof. The winding core portion is configured such that the positive-electrode active material layer 14 formed on the surface of the positive-electrode current collector body and the negative-electrode active material layer 24 formed on the surface of the negative-electrode current collector body are laminated thickly so as to overlap with each other. Further, at both ends of the wound electrode body 80 in the winding-shaft direction, a positive-electrode active material layer non-forming part of the positive electrode sheet 10 and a negative-electrode active material layer non-forming part of the negative electrode sheet 20 protrude outwardly from the winding core portion, respectively. A positive-electrode current collector plate is attached to a positive-electrode-side protruding part (that is, the positive-electrode active material layer non-forming part), and a negative-electrode current collector plate is attached to a negative-electrode side protruding part (that is, the negative-electrode active material layer non-forming part), so that they are electrically connected to the positive terminal 70 and the negative terminal 72, respectively.

Note that, it can be confirmed, by a general ion chromatography (IC) technique, that the positive-electrode active material including sulfate ions is used in the nonaqueous electrolyte secondary battery. More specifically, initially, the battery is disassembled to take out the positive electrode. Then, the positive-electrode active material layer as a measurement subject is immersed in an appropriate solvent (e.g., EMC) and then washed. After that, the positive-electrode active material layer is cut into an appropriate size, so as to obtain a measurement sample. The measurement sample is immersed in 50%-acetonitrile ($CH_3CN$) aqueous solution for a predetermined time (e.g., about 1 to 30 minutes). Thus, a $SO_4^{2-}$ component as a measurement subject is extracted in the solvent. The solution is subjected to IC measurement, so as to generally find a content (mol) of sulfate ions included in the positive-electrode active material.

Further, it can be generally confirmed, by analysis of the films formed on the surfaces of the active materials, that LPFO is added into the battery, for example. More specifically, initially, the battery is disassembled to take out the positive electrode and the negative electrode. Then, the positive-electrode active material layer and the negative-electrode active material layer as a measurement subject are immersed in respective appropriate solvents (e.g., EMC) and then washed. After that, the positive-electrode active material layer and the negative-electrode active material layer are each cut into an appropriate size, so as to obtain measurement samples. The measurement samples are immersed in ion-exchange water for a predetermined time (e.g., about 1 to 30 minutes). Thus, film components (ions derived from LPFO) as a measurement subject are extracted in the solvent. The solution is subjected to measurement by general ion exchange chromatography (IC), and hereby, it can be confirmed that LPFO is added into the battery, from the presence and the content (mol) of ions (e.g., $C_2O_4^{2-}$) derived from LPFO in the films formed on the surfaces of the positive-electrode active material and the negative-electrode active material.

The nonaqueous electrolyte secondary battery obtained by the above manufacturing method has a feature that excellent battery characteristics (an output characteristic and a cycle characteristic) are exhibited under a wide temperature environment. For example, the nonaqueous electrolyte secondary battery has such features that: at the time of normal use, a high energy density and high input-output characteristics, and a high durability (a cycle characteristic and a high-temperature storage characteristic) are achievable; and at the time of overcharge, an excellent reliability (resistance) can be exhibited. Accordingly, examples of a target to which the manufacturing method described herein is applied include: a large-capacity nonaqueous electrolyte secondary battery having a theoretical capacity of not less than 4 Ah (e.g., not less than 10 Ah, particularly not less than 20 Ah) but not more than 100 Ah; a nonaqueous electrolyte secondary battery that can be used in a charging and discharging cycle in which charging and discharging is repeated at a high rate of not less than 5 C (e.g., 5 C to 50 C), preferably 10 C or more, particularly preferably 20 C or more (e.g., 20 C to 50 C); and a nonaqueous electrolyte secondary battery of which a storage environment or an operating environment can be a wide temperature environment of −30° C. to 60° C. (e.g., −20° C. to 60° C.).

The battery described herein can be used as a vehicle drive power supply by making use of the above features. The type of the vehicle is not limited in particular, but may be, for example, a plug-in hybrid vehicle (PHV), a hybrid vehicle (HV), an electric vehicle (EV), an electric truck, a motorized bicycle, an electric assist bicycle, a powered wheelchair, an electric railway, and the like. Note that the nonaqueous electrolyte secondary battery may be used in a form of a battery pack configured such that a plurality of nonaqueous electrolyte secondary batteries is connected in series and/or in parallel to each other.

The following describes some examples related to the present invention, but it is not intended to limit the present invention to the following concrete examples.

<I. Examination of Battery Characteristics>

First, a mixed solution including nickel sulfate, cobalt sulfate, and manganic sulfate was prepared, and then, aqueous sodium hydroxide was added thereto, so as to neutralize the mixed solution. Ammonium ions were supplied to the solution, so as to obtain a hydroxide of a transition metal, as a precursor of a positive-electrode active material. The hydroxide of the transition metal was mixed with lithium carbonate and burned at a burning temperature of 900° C. to 1000° C. for 10 hours to 15 hours. In this way, positive-electrode active materials ($LiNi_{1/3}CO_{1/3}Mn_{1/3}O_4$ powders, C1 to C6) having different amounts of remaining sulfate ions of 0.02 mmol/m² to 0.20 mmol/m² per unit specific surface area were obtained. Note that the amounts of sulfate ions occupied 0.2 mass % to 2.5 mass % when a whole positive-electrode active material was assumed 100 mass %. Subsequently, each of the positive-electrode active materials (C1 to C6), acetylene black (AB) as a conductive material, and polyvinylidene fluoride as a binder were mixed in N-methylpyrrolidone so that a mass ratio of these materials was 90:8:2. Thus, a slurry composition was prepared. The composition was applied to both surfaces of an elongated aluminum foil (a positive-electrode current collector body). Then, the composition was dried and pressed. In this way, six types of positive electrode sheets each having a positive-electrode active material layer on a positive-electrode current collector body were manufactured.

Subsequently, amorphous carbon coated natural graphite (C) as a negative-electrode active material, styrene butadiene rubber as a binder, and carboxymethyl cellulose as a dispersing agent were mixed with ion-exchange water so that a mass ratio of these materials was 98:1:1. Thus, a slurry composition was prepared. The composition was applied to both surfaces of an elongated copper foil (a negative-electrode current collector body), and then dried and pressed. Hereby, a negative electrode sheet having a negative-electrode active material layer on the negative-electrode current collector body was manufactured.

Then, the positive electrode sheet and the negative electrode sheet thus formed were laminated via two separators. The separators used herein have a three-layer structure in which polypropylene (PP) was laminated on either side of polyethylene (PE). A laminated body thus obtained was wound in a lengthwise direction, and then shaped into a flat shape. In this way, six types of wound electrode bodies different only in content of sulfate ions in a positive electrode were manufactured. Then, a positive terminal and a negative terminal were attached to a cover of a battery outer case, and the terminals were welded to those parts of the positive-electrode current collector body and the negative-electrode current collector body which were exposed at ends of the wound electrode body, respectively. The wound electrode body thus connected to the cover was accommodated in a battery outer case from its opening, and the opening was welded to the cover.

Subsequently, seven types of nonaqueous electrolytes different only in ratio of lithium difluoro bis-oxalate phosphate (LPFO) were prepared. That is, a nonaqueous electrolyte was prepared in such a manner that: a mixed solvent containing ethylene carbonate (EC), dimethyl carbonate (DMC), and ethylmethyl carbonate (EMC) such that a volume ratio thereof satisfied EC:DMC:EMC=30:40:30 was prepared; and then, $LiPF_6$ as a supporting salt was dissolved in the mixed solvent so that a concentration thereof was 1.1 mol/L. Then, the other nonaqueous electrolytes were each prepared in such a manner that: 0.003 μmol/m² to 0.073 μmol/m² (here, 0.008 mol/L to 0.2 mol/L) of LPFO per unit specific surface area of positive-electrode and negative-electrode active materials included in a battery was added to the above nonaqueous electrolyte. Then, the nonaqueous electrolyte thus prepared was poured from an electrolyte injection hole provided in the cover of the battery outer case. In this way, lithium-ion secondary batteries were assembled. Here, 42 types of lithium-ion secondary batteries were assembled by combining the 6 types of wound electrode bodies and the 7 types of nonaqueous electrolytes.

(Measurement of Initial Capacity)

An initial charge was performed on the batteries thus assembled. More specifically, three cycles of charging and discharging was performed on the batteries. Here, one cycle was performed such that: a battery was charged (by CC charge) at a constant current of 1 C under an environment of 25° C. until a voltage between positive and negative terminals reached 4.1 V; the battery was charged (by CV charge) at a constant voltage so that a total charging time was 1.5 hours; then, the charging was stopped for ten minutes; after that, the battery was discharged (by CC discharge) at a constant current of 1 C until the voltage between the positive and negative terminals reached 3.0 V; subsequently, the battery was discharged (by CV discharge) at a constant voltage so that a total discharging time was 1.5 hours; and then, the discharging was stopped for ten minutes. By performing the charging process, films (typically, films including oxalate ions) derived from LPFO were formed on surfaces of the positive-electrode active material and the negative-electrode active material. Further, a CCCV discharge capacity in the third cycle was assumed a battery capacity (initial capacity).

(High Temperature Storage Test)

Under a temperature environment of 25° C., the batteries were adjusted to a charging state with an SOC of 80% by constant-current charge of 1 C. The batteries were then put into a constant-temperature bath of 60° C., and stored for 100 days. Then, respective battery capacities after the high temperature storage test were measured in the same procedure as the initial capacity, and respective capacity retention rates (%) were calculated according to the following formula: (Capacity after High Temperature Storage Test/Initial Capacity)×100.

The results are shown in Table 1.

TABLE 1

Capacity retention rate after high temperature storage test (%)

| | | LPFO amount (μmol/m²) per unit surface area of positive-electrode and negative-electrode active materials | | | | | | |
|---|---|---|---|---|---|---|---|---|
| | | 0 | 0.003 | 0.004 | 0.015 | 0.029 | 0.037 | 0.073 |
| Sulfate ion amount (mmol/m²) per unit surface area of positive-electrode active material | 0.02 | 83.8 | 84.3 | 84.6 | 84.9 | 85.3 | 85.6 | 86.0 |
| | 0.04 | 83.4 | 84.1 | 87.1 | 87.9 | 88.3 | 88.7 | 89.3 |
| | 0.07 | 83.0 | 83.8 | 87.2 | 88.1 | 88.6 | 89.1 | 89.6 |
| | 0.12 | 82.4 | 83.6 | 87.4 | 88.2 | 88.9 | 89.4 | 90.2 |
| | 0.16 | 82.0 | 83.7 | 87.7 | 88.6 | 89.1 | 89.3 | 90.5 |
| | 0.20 | 81.2 | 83.4 | 87.8 | 88.7 | 89.6 | 89.8 | 90.8 |

As illustrated in Table 1, in a case where an additive amount of LPFO was 0.003 μmol/m² or less per unit surface area of the positive-electrode and negative-electrode active materials, the capacity retention rate after high-temperature storage was relatively low. Further, in a case where a content of sulfate ions was 0.02 mmol/m² or less per unit surface area of the positive-electrode active material, the capacity retention rate after high-temperature storage was about 85%, which was slightly low. In contrast, in a case where the content of sulfate ions was 0.04 mmol/m² or more per unit surface area of the positive-electrode active material and the additive amount of LPFO was 0.004 μmol/m² or more per unit surface area of the positive-electrode and negative-electrode active materials, the capacity retention rate of about 90%, which was high, was maintained even after high-temperature storage. A conceivable reason is as follows, for example: a film derived from sulfate ions and LPFO was formed on the surface of the positive-electrode active material, so that elution of a constituent metal element (typically, a transition metal element, e.g., a manganese element) from the positive-electrode active material was restrained, which made it difficult for metal to be precipitated on the surface of the opposed negative electrode. Further, it was found that in a case where LPFO was included in the nonaqueous electrolyte, a more excellent capacity retention characteristic was achievable as the positive-electrode active material included more sulfate ions.

(Low-Temperature Output Test)

Under a temperature environment of 25° C., the batteries were adjusted to a charging state with an SOC of 30% by constant-current charge of 1 C. The batteries were moved into a constant-temperature bath of −30° C., and a constant-current discharge test was performed to evaluate an output that reached a voltage of 2.2 V in two seconds.

The results are shown in Table 2.

TABLE 2

Output measurement result (w) of low-temperature output test

| | | \multicolumn{7}{c}{LPFO amount ($\mu mol/m^2$) per unit surface area of positive-electrode and negative-electrode active materials} | | | | | | |
|---|---|---|---|---|---|---|---|---|
| | | 0 | 0.003 | 0.004 | 0.015 | 0.029 | 0.037 | 0.073 |
| Sulfate ion amount ($mmol/m^2$) per unit surface area of positive-electrode active material | 0.02 | 81.7 | 81.4 | 80.8 | 80.4 | 79.8 | 78.4 | 73.5 |
| | 0.04 | 91.2 | 92.2 | 111.7 | 120.6 | 118.8 | 117.6 | 93.1 |
| | 0.07 | 103.5 | 104.2 | 124.5 | 131.2 | 133.2 | 129.3 | 107.4 |
| | 0.12 | 105.2 | 106.7 | 120.6 | 127.6 | 127.6 | 126.4 | 103.6 |
| | 0.16 | 103.2 | 103.8 | 110.2 | 115.2 | 121.6 | 121.3 | 101.7 |
| | 0.20 | 85.5 | 87.4 | 88.2 | 89.1 | 89.5 | 90.1 | 89.2 |

As illustrated in Table 2, in a case where a content of sulfate ions was 0.02 $mmol/m^2$, which was low, per unit surface area of the positive-electrode active material, a low-temperature output was relatively low. Further, it was found that, in a case where the content of sulfate ions was 0.02 $mmol/m^2$, which was low, the low-temperature output was lower as the additive amount of LPFO were larger. A conceivable reason is as follows: in a case where the additive amount of LPFO was 0.003 $\mu mol/m^2$ or less, a high-resistance film (e.g., a film including lithium carbonate and lithium hydroxide) was formed on the surface of the positive-electrode active material, so that a resistance of the positive electrode increased, and decomposition of the positive-electrode active material was promoted. Further, in a case where the additive amount of LPFO was 0.004 $\mu mol/m^2$ to 0.073 $\mu mol/m^2$, the following reason was conceivable in addition to the above reason. That is, a metal element eluted from the positive-electrode active material was precipitated so as to increase a resistance in the negative electrode. It was conceivable that as the additive amount of LPFO increased, a thickness of the film derived from LPFO increased, which disturbed migration of lithium ions. On the other hand, even in a case where the content of sulfate ions was 0.20 $mmol/m^2$, which was high, per unit surface area of the positive-electrode active material, the low-temperature output was relatively low. A conceivable reason is as follows: the surface of the positive-electrode active material was coated with sulfate ions (typically, lithium sulfate), so that a resistance in the positive electrode increased. Further, in addition to the above reason, it was conceivable that, in a case where the additive amount of LPFO was 0.073 $\mu mol/m^2$, the thickness of the film derived from LPFO increased, which disturbed migration of lithium ions.

In contrast to these examples, in a case where the content of sulfate ions per unit surface area of the positive-electrode active material was 0.04 $mmol/m^2$ to 0.016 $mmol/m^2$, a high output characteristic of 91 W or more was achieved even at −30° C. Conceivable reasons are as follows: (a) due to the presence of sulfates ions (typically, lithium sulfate) on the surface of the positive electrode, generation of high-resistance lithium carbonate and lithium hydroxide was restrained, which made it possible to decrease a resistance of the positive electrode; (b) stability of the positive-electrode active material was raised, which made it possible to restrain elution of a constituent metal element; (c) due to the above (b), metal deposition in the negative electrode was restrained; and the like reasons. Especially, in a case where the amount of LPFO was 0.003 $\mu mol/m^2$ to 0.037 $\mu mol/m^2$ per unit surface area of the positive-electrode and negative-electrode active materials, a low-temperature characteristic of 110 W or more, which was markedly high, was exhibited. From these results, it was found that, when the positive-electrode active material included sulfate ions by 0.04 to 0.16 $mmol/m^2$ per unit specific surface area of the positive-electrode active material, and when the nonaqueous electrolyte included LPFO by 0.003 $\mu mol/m^2$ to 0.037 $\mu mol/m^2$ per unit specific surface area of the positive-electrode and negative-electrode active materials, both durability and input-output characteristics could be compatible with each other at a high level. Such a result indicates a technical significance of the present invention.

<II. Examination of Overcharge Resistance>

In terms of the test examples that exhibited a high-temperature storage characteristic and a low-temperature output characteristic at a high level in Examination I., durability at the time of overcharge was further examined. More specifically, similarly to Examination I., positive-electrode active materials including sulfate ions by respective amounts, as shown in Table 3, per unit specific surface area of a positive-electrode active material, were prepared, and positive electrodes were manufactured by use of the positive-electrode active materials. Then, by use of the positive electrodes and nonaqueous electrolytes including LPFO and lithium difluorophosphate ($LiPO_2F_2$) by respective amounts, as shown in Table 3, per unit specific area of positive-electrode and negative-electrode active materials, 24 types of nonaqueous electrolyte secondary batteries, in total, were assembled. Note that a concentration of $LiPO_2F_2$ in each of the nonaqueous electrolytes was in a range of 0.02 mol/L to 0.25 mol/L.

(Overcharge Test)

Under a temperature environment of 25° C., the batteries were charged by CC charge of 1 C at a constant current until their voltages reached 10 V, and then charged by CV charge until a total charging time was 1.5 hours.

Maximum achievable temperatures (° C.) thereof at this time were shown in Table 3.

TABLE 3

| Maximum achievable temperature (° C.) at the time of overcharge test | | | | | | | |
|---|---|---|---|---|---|---|---|
| Sulfate ion amount | LPFO amount | $LiPO_2F_2$ amount (μmol/m²) per unit surface area of positive-electrode and negative-electrode active materials | | | | | |
| (mmol/m²) | (μmol/m²) | 0 | 0.007 | 0.018 | 0.037 | 0.055 | 0.092 |
| 0.04 | 0.004 | 150° C. | 149° C. | 140° C. | 139° C. | 137° C. | 135° C. |
| 0.16 | 0.004 | 151° C. | 150° C. | 142° C. | 141° C. | 139° C. | 138° C. |
| 0.04 | 0.037 | 150° C. | 150° C. | 141° C. | 139° C. | 138° C. | 136° C. |
| 0.16 | 0.037 | 148° C. | 147° C. | 137° C. | 136° C. | 134° C. | 133° C. |

As illustrated in Table 3, the maximum achievable temperatures of the batteries of all the test examples were around 150° C., and the batteries generally had a high overcharge resistance. A conceivable reason is as follows: in the test examples that exhibited a high-temperature storage characteristic and a low-temperature output characteristic at a high level in Examination I., the elution of the metal element from the positive-electrode active material was restrained, so that structural stability of the positive-electrode active material at the time of detachment of Li was high and a heat generation amount was small. Especially, in a case where the amount of $LiPO_2F_2$ per unit surface area of the positive-electrode and negative-electrode active materials was 0.018 μmol/m² or more, a reaction (typically, an oxidation reaction) between the active material (typically, the positive-electrode active material) and the nonaqueous electrolyte was highly restrained due to a film derived from $LiPO_2F_2$, and hereby, it was found that the maximum achievable temperature could be restrained to 140° C. or less. Further, in a case where the additive amount of $LiPO_2F_2$ per unit surface area of the positive-electrode and negative-electrode active materials was 0.092 μmol/m² or less, it was found that a resistance of the film derived from $LiPO_2F_2$ could be restrained to be low.

The present invention has been described in detail as above, but the above embodiment and examples are just examples. The invention described herein includes embodiments obtained by variously modifying or altering the concrete embodiments exemplified as above.

What is claimed is:

1. A method for manufacturing a nonaqueous electrolyte secondary battery, the method comprising:
preparing a positive-electrode active material including sulfate ions by not less than 0.04 mmol/m² but not more than 0.16 mmol/m² per unit specific surface area;
manufacturing a positive electrode by use of the positive-electrode active material including sulfate ions;
manufacturing a negative electrode by use of a negative-electrode active material;
assembling a battery assembly by accommodating the positive electrode, the negative electrode, and a nonaqueous electrolyte including lithium difluoro bis-oxalate phosphate in a battery outer case, wherein an additive amount X (μmol) of the lithium difluoro bis-oxalate phosphate in the nonaqueous electrolyte is determined so as to satisfy the following formula (I):

$$0.004 \leq \frac{X}{(Sc \cdot Wc + Sa \cdot Wa)} \leq 0.037 \quad \text{(I)}$$

wherein in the formula (I), Sc indicates a specific surface area (m²/g) of the positive-electrode active material, Wc indicates a mass (g) of the positive-electrode active material, Sa indicates a specific surface area (m²/g) of the negative-electrode active material, and Wa indicates a mass (g) of the negative-electrode active material; and
performing a charging process on the battery assembly at least once, so as to form films on surfaces of the positive-electrode active material and the negative-electrode active material.

2. The method for manufacturing the nonaqueous electrolyte secondary battery, according to claim 1, further comprising:
in the assembling of the battery assembly, adding lithium difluorophosphate to the nonaqueous electrolyte, in addition to the lithium difluoro bis-oxalate phosphate, wherein
an additive amount Y (μmol) of the lithium difluorophosphate in the nonaqueous electrolyte is determined so as to satisfy the following formula (II):

$$0.018 \leq \frac{Y}{(Sc \cdot Wc + Sa \cdot Wa)} \leq 0.092 \quad \text{(II)}$$

wherein, in the formula (II), Sc, Wc, Sa, and Wa are the same as those in the formula (I).

3. The method for manufacturing the nonaqueous electrolyte secondary battery, according to claim 1, wherein a lithium transition metal composite oxide having a layered or spinel structure is used as the positive-electrode active material.

4. A nonaqueous electrolyte secondary battery, comprising
a battery assembly by accommodating a positive electrode, a negative electrode, and a nonaqueous electrolyte including lithium difluoro bis-oxalate phosphate in a battery outer case, wherein
the nonaqueous electrolyte secondary battery is manufactured by the manufacturing method according to claim 1.

* * * * *